May 12, 1959   P. B. LAVANCHY ET AL   2,886,467
ADHESIVE TAPES

Filed April 2, 1956   2 Sheets-Sheet 1

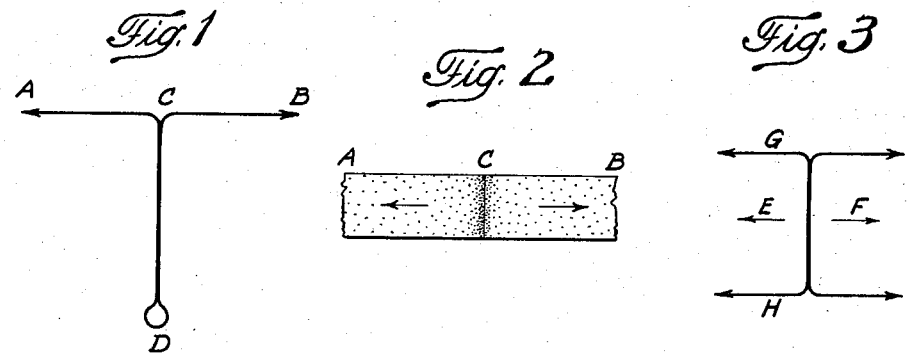

Fig. 1  Fig. 2  Fig. 3

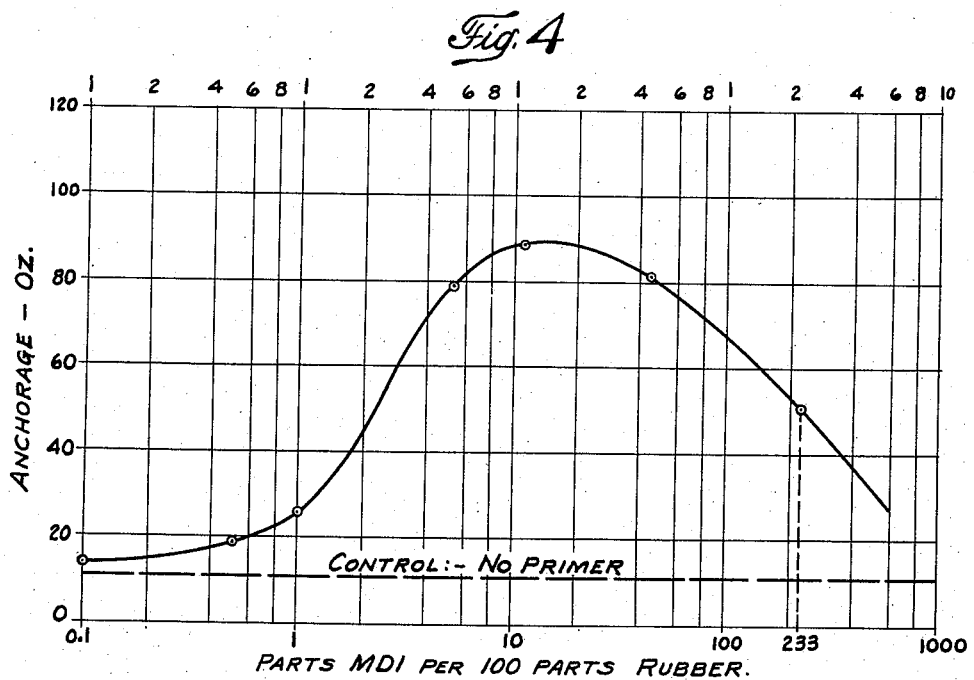

Fig. 4

FORMULATION:
  PALE CREPE + MDI       15.92 PARTS
  CUMENE HYDROPEROXIDE    0.08   "
  TOLUENE                84.00   "
  RUBBER MILLED 25 PASSES WITH 1 MIL NIP
    (VISCOSITY OF 25% SOL'N : 29,000 CENTIPOISES)
  COOK : NONE.

PRIMED IMMEDIATELY AFTER MIXING.
COATED 2 DAYS AFTER PRIMING.

INVENTORS
PATRICIA BJERREGAARD LAVANCHY
HAROLD N. SONNICHSEN
JOHN F. McELROY
BY Morgan, Finnegan, Durham & Pine
ATTORNEYS.

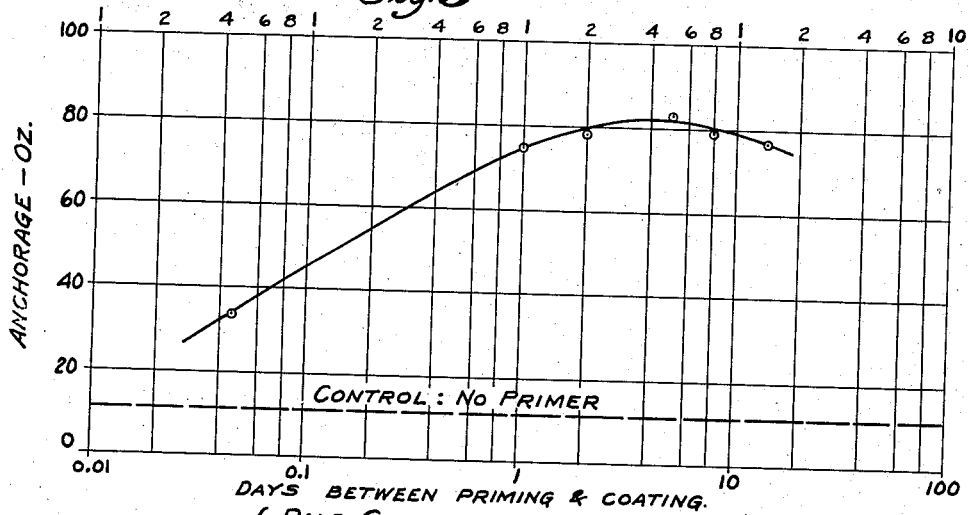
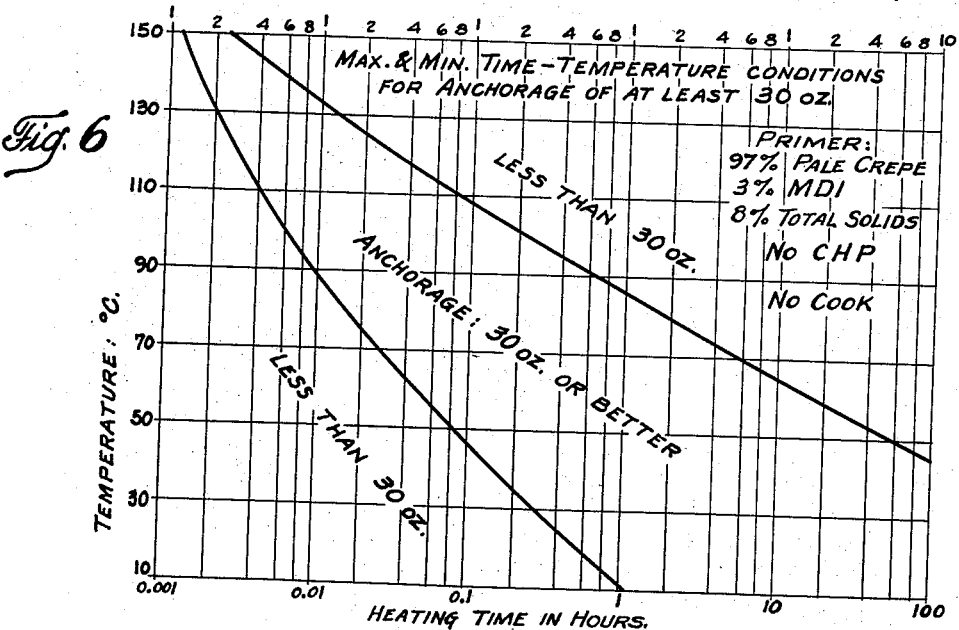
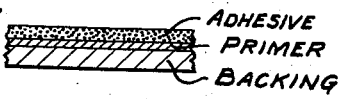

United States Patent Office 2,886,467
Patented May 12, 1959

2,886,467
ADHESIVE TAPES

Patricia Bjerregaard Lavanchy, Drexel Hill, Pa., Harold M. Sonnichsen, Cranbury, N.J., and John F. McElroy, Peabody, Mass., assignors, by mesne assignments, to Johnson & Johnson, New Brunswick, N.J., a corporation of New Jersey Application April 2, 1956, Serial No. 575,415

8 Claims. (Cl. 117—76)

This invention relates to an improved pressure-sensitive cellulosic sheet having on at least one surface thereof a normally tacky pressure-sensitive adhesive film or coating, and more particularly, to an improved means of bonding the pressure-sensitive adhesive to the cellulosic backing material. This application is a continuation-in-part of our co-pending application Serial No. 451,112, filed August 25, 1954, now abandoned, which is in turn a continuation-in-part of abandoned application Serial No. 225,902, filed May 11, 1951.

A requisite condition of pressure-sensitive tape is that on unrolling, no adhesive be transferred to the reverse side of the backing material. Another requisite condition is that no part of the adhesive remains behind when the tape is removed from a surface to which it has been applied. If a tape does not meet these two requisite conditions, it may be said to lack anchorage. A tape possessing good anchorage may be defined as one showing strong affinity between adhesive and backing, i.e., wherein there is strong resistance to the forceful separation of the pressure-sensitive adhesive from the backing material. Tapes not possessing adequate anchorage as defined above are difficult or impossible to use.

Anchorage may be attained to a degree by using so-called primers which are interposed between the adhesive and the flexible backing. Some primers of the prior art have had moderate commercial success, and at least one has been used extensively in the manufacture of film-backed tapes. The best primers known were moisture-sensitive and would not retain a bond between the adhesive and backing if the tape were subjected to water or to high humidities such as are encountered in tropical climates.

An object of this invention is to provide new and improved pressure-sensitive cellulosic tape or adhesive sheets. A further object of this invention is to provide cellulosic adhesive sheets having the greatest possible anchorage. A still further object is to provide adhesive sheets on cellulosic backings, such as regenerated cellulose film, not seriously affected by water or high humidities. Further objects of this invention will be apparent from the following specification.

In accordance with this invention, a cellulosic backing is precoated with from one one-hundredth to one-half of an ounce per square yard of a composition comprising from one to three hundred fifty parts by weight of a polyfunctional isocyanate and with one hundred parts of an elastomer. Elastomers may be selected from the following group:

(1) Natural rubber.
(2) Copolymers of butadiene and styrene comprising at least 30% by weight of butadiene.
(3) Polybutadiene.
(4) Copolymers of isobutylene and a diene, such as isoprene.

We mean to include Butyl rubber and products of joint polymerization corresponding substantially to two or more of the above unsaturated substances and mixtures of two or more polymeric substances such as mentioned above. Materials other than those mentioned specifically may be present in the polymerized product.

By polyfunctional isocyanate, we mean:

m-Tolylene diisocyanate
    p-p'-Diisocyanate diphenyl methane
    1-chloro phenylene-2,4-diisocyanate
    1,6-hexane diisocyanate
    Anisidine diisocyanate
    Dianisidine diisocyanate or any isocyanate conforming to the general formula: $R(N=C=O)_x$ where $x$ is 2 or larger and R is a polyvalent organic radical selected from the group consisting of an aryl, alkyl, substituted aryl and a substituted alkyl. The plurality of isocyanate groups appear to be the sole reacting groups.

The precoated cellulosic sheet is coated with a normally tacky pressure-sensitive adhesive based on one or more of the above-mentioned polymers. It is not necessary that the polymer in the primer and the polymer in the adhesive be the same. Excellent results are obtained, particularly with the most outstanding primers based on natural rubber or butadiene-styrene, when they are used with adhesives based on other members of the above mentioned polymer group.

After coating, the cellulosic backing and the primer are allowed to react with each other before application of the adhesive. The primer, coated on the cellulosic backing, is permitted to age thereon at a suitable temperature and for a sufficient period of time to permit the primer to become well bonded to the backing. The time of aging will depend upon the temperature of bonding and the presence or absence of a suitable catalyst. Hence, the higher the temperature of aging the lower will be the time required and in like manner, the time of aging is lower wherein a catalyst is employed. In any event the conditions employed should be such that the primer is well bonded to the backing without causing significant harm to the backing or a lessening in the desired characteristics thereof.

Experiments point to the fact that a primary chemical bond is created between the cellulosic backing and the polymer. This film of polymer bonded to the backing forms the effective primer. In the case of natural rubber and p-p' diisocyanate diphenyl methane, we believe that the reactions are as follows:

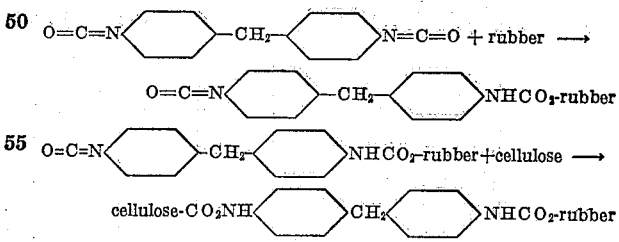

Although it is believed that formation of primary chemical bonds is the explanation of the excellent anchorage and good water resistance of the sheets made according to this invention, we do not wish to be limited by this theory.

Cellulosic tapes or sheets prepared according to this invention have marked water resistance. Such adhesive sheets or tapes may be placed on surfaces such as glass or cardboard and immersed in water for many hours without loss of anchorage. Cellulosic sheets or tapes using a conventional primer, but otherwise similar to those made according to this invention, separate in as little as three minutes when subjected to this treatment.

For typical commercial anchorage tests, reference is made to the drawings. In these drawings:

Fig. 1 is a schematic side view of a cellulosic adhesive sheet undergoing one of the tests;

Fig. 2 is a top plan view illustrating the same test;

Fig. 3 is a schematic side view illustrating another test;

Fig. 4 shows the anchorage obtained with primer utilizing a wide range of polyfunctional isocyanate contents;

Fig. 5 shows the effect of time between applying the primer and applying the adhesive coating upon the final mass anchorage;

Fig. 6 shows the effect of varying time and temperature of aging the primer on a cellulosic backing upon the final mass anchorage of an adhesive to the primed film; and Fig. 7 is a vertical cross sectional view of a normally tacky and pressure-sensitive sheet prepared in accordance with this invention.

In accordance with the test illustrated in Fig. 1 and Fig. 2 adhesive tape is brought into adhesive to adhesive contact as shown at line CD. If this tape can be pulled out rapidly in a straight line in directions A and B without separation of the adhesive from the backing, anchorage is considered fair. In the test illustrated in Fig. 3, two pieces of adhesive sheet are brought into contact along lines GH. The strips are then separated by pulling in the directions E and F, respectively. This is repeated several times until the adhesive starts to separate from the backing. If the adhesive does not separate from the backing after three or more strong adhesive bonds are formed and undone by repeated separation, anchorage is considered good.

To illustrate the representative embodiments of the invention by way of example only but not to limit its scope in any way, illustrative examples are furnished below, and it should be noted that all figures given refer to parts by weight unless otherwise specified:

EXAMPLE I

| | |
|---|---|
| Natural rubber (smoked sheet) | 50 |
| P-P'-diisocyanato diphenyl methane | 50 |
| Xylene | 450 |

The rubber was thoroughly dispersed in xylene and the dispersion was boiled under reflux for four and one-half hours before the addition of the diisocyanate. After this addition boiling continued for twenty-four hours at one hundred thirty-eight degrees centigrade. The refluxed material was coated on cellophane to provide a coating weight of five hundredths of an ounce per yard and the coated cellophane was allowed to stand for forty-eight hours. At the end of the standing period the following pressure-sensitive normally tacky adhesive mass was applied to the precoated sheet from thirty percent by weight solution in normal heptane to a dry coating weight of two ounces per square yard.

| | |
|---|---|
| Milled natural rubber (pale crepe) | 100 |
| Polybetapinene resin (melting point 90° C.) | 75 |
| Petroleum oil | 5 |
| Antioxidant (e.g. polymerized) (trimethyl di-hydro quinoline) | 2 |

The anchorage of the resulting product was very good and the adhesive would not separate normally from its backing nor would the affinity between adhesive and backing be weakened excessively after immersion of the product in water.

For further explanation of the invention reference is made to the following tables showing many illustrative examples using various primers and adhesives on cellulosic backings and also varying periods of treatment.

| | Primers | Hours Reacted | Reaction Temperature (° C.) | Backing Used | Adhesive On Primer Used | Adhesive Weight Used (oz./sq. yd.) | Interval Between Priming and Coating (Hour) | Anchorage Observed |
|---|---|---|---|---|---|---|---|---|
| II | Rubber, Natural (Smoked Sheet). Methylene Bis (4 Phenyl Isocyanate). Ortho Dichloro Benzene. Xylene. | 50 25 25 450 | 24 | 138 | Regenerated Cellulose Film. | Type A, B, and E. | 0.75 | 48 | Good. |
| III | Rubber, Natural (Pale Crepe). M-Tolylene Diisocyanate. Toluene. Xylene. | 100 50 500 100 | 26 | 138 | As Above | Type A | 0.75 | 48 | Do. |
| IV | Rubber, Natural (Smoked Sheet). Methylene Bis (4 Phenyl Isocyanate). Toluene. Ortho Dichloro Benzene. | 250 125 3,600 125 | 32 | 110 | ____do____ | Types A, B and C. | 1 | 76 | Do. |
| V | Rubber, Natural (Smoked sheet). Methylene Bis (4 Phenyl Isocyanate). Ortho Dichloro Benzene. Toluene. | 250 65 60 2,250 | 170 | 100 | ____do____ | Type A | 1 | 24 | Do. |
| VI | Rubber, Natural (Pale Crepe). Peptizer (Zinc Salt of Naphthyl B-Mercaptan). M-Tolylene Diisocyanate. Toluene. | 200 2 40 2,040 | 17 | 110 | Cellulose Acetate | Types A and B. | 1 | 36 | Do. |
| VII | Rubber, Natural (Pale Crepe). Peptizer (Naphthyl B-Mercaptan). M-Tolylene Diisocyanate. Toluene. | 200 2 30 2,500 | 16 | 110 | Regenerated Cellulose Film. | Types B and C. | 1 | 48 | Do. |
| VIII | Rubber, Natural (Pale Crepe). Peptizer (Zinc Salt of Naphthyl B-Mercaptan). M-Tolylene Diisocyanate. Toluene. | 200 2 200 2,500 | 19 | 110 | As Above | Type A | 1 | 24 | Fair to Good. |
| IX | Rubber, Natural (Pale Crepe). Peptizer (Zinc Salt of Naphthyl B-Mercaptan). M-Tolylene Diisocyanate. Toluene. | 200 2 10 2,500 | 17 | 110 | ____do____ | ____do____ | 1 | 100 | Do. |

| | Primers | | Hours Reacted | Reaction Temperature (° C.) | Backing Used | Adhesive On Primer Used | Adhesive Weight Used (oz./sq. yd.) | Interval Between Priming and Coating (Hour) | Anchorage Observed |
|---|---|---|---|---|---|---|---|---|---|
| X | High Molecular Weight Butyl Vinyl Ether Polymer | | 21 | 110 | Regenerated Cellulose Film, Cellulose Acetate. | Type D | 1 | 200 | Good. |
| | M-Tolylene Diisocyanate | 200 100 | | | | | | | |
| | Toluene | 2,500 | | | | | | | |
| XI | Rubber, Natural (Pale Crepe). | 200 | 20 | 110 | As Above | Type B | 1 | 60 | Fair. |
| | M-Tolylene Diisocyanate | 50 | | | | | | | |
| | Peptizer (Zinc Salt of Xylyl Mercaptan). | 1 | | | | | | | |
| | Toluene | 2,500 | | | | | | | |
| XII | Rubber, Natural (Pale Crepe). | 200 | 20 | 110 | ----do-------- | ----do-------- | 1.5 | 50 | Do. |
| | Peptizer (Zinc Salt of Phenyl Beta Mercaptan). | 1 | | | | | | | |
| | Methylene Bis (4 Phenyl Isocyanate). | 5 | | | | | | | |
| | M-Tolylene Diisocyanate | 20 | | | | | | | |
| | Ortho Dichloro Benzene | 5 | | | | | | | |
| | Toluene | 2,500 | | | | | | | |
| XIII | Rubber, Natural (Pale Crepe). | 200 | 16 | 110 | ----do-------- | Types A and C. | 1 | 72 | Do. |
| | Peptizer (Zinc Salt of Xylyl Mercaptan). | 1 | | | | | | | |
| | M-Tolyene Diisocyanate | 20 | | | | | | | |
| | Toluene | 2,500 | | | | | | | |
| XIV | Rubber, Natural (Pale Crepe). | 200 | 21 | 110 | ----do-------- | Type A | 1 | 72 | Poor (This is a Control). |
| | Peptizer (Zinc Salt of Xylyl Mercaptan). | 2 | | | | | | | |
| | Octadecyl isocyanate | 100 | | | | | | | |
| | Toluene | 2,500 | | | | | | | |
| XV | Rubber, Natural (Pale Crepe). | 200 | 21 | 110 | ----do-------- | Types A and B. | 1 | 48 | Fair to Good. |
| | Peptizer (Zinc Salt of Xylyl Mercaptan). | 2 | | | | | | | |
| | M-Tolylene Diisocyanate | 40 | | | | | | | |
| | Toluene | 2,000 | | | | | | | |
| XVI | Rubber, Natural (Pale Crepe). | 200 | 21 | 110 | ----do-------- | Types A, B and C. | 1 | 48 | Fair. |
| | Peptizer (Zinc Salt of Xylyl Mercaptan). | 2 | | | | | | | |
| | P-P' Diisocyanate Diphenyl Methane. | 100 | | | | | | | |
| | Toluene | 2,000 | | | | | | | |
| XVII | Rubber, Natural (Pale Crepe). | 200 | 20 | 110 | ----do-------- | As Above | 1 | 48 | Good to Fair. |
| | Peptizer (Zinc Salt of Xylyl Mercaptan). | 2 | | | | | | | |
| | M-Tolylene Diisocyanate | 40 | | | | | | | |
| | Toluene | 2,000 | | | | | | | |
| XVIII | Polybutadiene Rubber | 200 | 7 | 110 | Regenerated Cellulose Film. | Type A | 1 | 144 | Do. |
| | Zinc Salt of Xylyl Mercaptan. | 2 | | | | | | | |
| | Toluene | 2,000 | | | | | | | |
| XIX | Butadiene (75%) Styrene (25%) Copolymer. | 200 | 2 | 110 | ----do-------- | ----do-------- | 0.9 | 48 | Excellent. |
| | Zinc Salt of Xylyl Mercaptan | 2 | | | | | | | |
| | Toluene | 200 | | | | | | | |
| | P-P' Diisocyanate Diphenyl Methane. | 40 | | | | | | | |

*Type A*

| | |
|---|---|
| Milled pale crepe rubber | 100 |
| Polybetapinene resin | 75 |
| Petroleum oil | 5 |
| Polymerized trimethyldihydroquinoline | 2 |

*Type B*

| | |
|---|---|
| Milled smoked sheet rubber | 100 |
| Zinc oxide | 50 |
| Dehydrogenated rosin | 75 |
| Sym. di-beta-napthyl-para-phenylenediamine | 2 |
| Lanolin | 10 |

*Type C*

| | |
|---|---|
| Butadiene-styrene copolymer (butadiene-styrene ratio 70:30, Mooney value 50) | 50 |
| Smoked sheet | 50 |
| Ester of hydrogenated rosin | 50 |
| Polybetapinene resin | 16 |
| Polymerized trimethyldihydroquinoline | 2 |
| Petroleum oil | 20 |

*Type D*

| | |
|---|---|
| Polyvinyl ethyl ether resin, intrinsic viscosity = 2.37 | 100 |
| Hydrogenated rosin | 5 |
| Phenylalpha napthylamine | 0.35 |
| Polyethylene Glycol 400 (di, tri) ricinoleate | 1.5 |

*Type E*

| | |
|---|---|
| Polyisobutylene high polymer, solid | 100 |
| Polyisobutylene polymer, viscose liquid | 70 |
| Toluene | 520 |

In accordance with the invention any cellulosic backing containing active hydrogen may be used such as regenerated cellulose and cellulose acetate.

Catalysts may be added in any desired proportions although from one to five parts by weight of catalyst per one hundred parts of elastomer is normally preferred. Among catalysts which speed up the reaction are benzoyl peroxide, di-tertiary butoxy diamino silane, trimethylamine, tertiary amines such as pyridine, and peroxides such as benzoyl peroxide and cumene hydroperoxide.

The following additional explanations may aid in further understanding of the invention.

A PREFERRED PROCEDURE FOR MAKING PRIMER BY REFLUX METHOD

Two thousand grams of commercial toluene are placed in a 4000 milliliter resin reaction kettle filled with a reflux condenser, stirrer, and heating jacket. Two hundred grams of finely cut rubber which has been milled twenty or more passes through a tight cold rubber mill are then added. Two grams of the zinc salt of xylyl mercaptan are added and gradual heating is commenced with stirring. Heating is regulated so that the solution will not boil in less time than about two hours. Faster heating will cause gel formation on the kettle walls.

After refluxing commences, water collects in the trap of the reflux arrangement. Refluxing usually continues from four to eight hours after which the appropriate quantity of di-isocyanate is added. After this addition, refluxing continues from four to thirty-six hours. At this time the primer preparation is complete.

TYPICAL METHODS OF APPLICATION

The primer is brushed, sprayed, or applied with a print roll to the backing; after which it is dried, either at room temperature or at elevated temperatures such as by passage through an oven at 65° C. to 95° C.

As indicated heretofore the primed film is subjected to an aging period to permit a reaction to take place between the film and the primer so that the primer is well bonded to the film. This aging period varies considerably depending upon the temperature of aging. For example, wherein the aging temperature is as high as 150° C. an aging period of less than a minute may be adequate while where the primed film is aged at room temperature an aging period of three to four days may be preferred.

After the primer has reacted with the film, a conventional pressure-sensitive rubber-based adhesive is usually applied. For transparent tapes, about one ounce per square yard is used. The adhesive is dried in the usual manner and tape rolls prepared. Although most adhesive tapes prepared with such primers exhibit excellent anchorage immediately, some tapes show an improvement in anchorage after storage for several weeks.

CATALYZED POLYISOCYANATE PRIMERS

Especially effective primers may be prepared for adhesive tapes by use of elastomers which are especially treated to make them useful with polyisocyanates as primers. The special treatment can take place in presence or absence of the polyisocyanate itself as illustrated by the following examples:

EXAMPLE XX

| | |
|---|---|
| Pale crepe rubber | 120 |
| Toluene | 1050 |
| Methylene bis (4-phenylisocyanate) | 24 |
| Cumere hydroperoxide | 6 |

Pale crepe in 480 parts of the toluene is combined with 24 parts polyisocyanate and 6 parts cumene hydroperoxide and thoroughly mixed mechanically. The remainder of the toluene is added and the mixture is heated to 95° C. with good agitation. After cooling the primer is thinly spread on cellophane or cellulose acetate. Mass is coated after 2-3 days. Instead of cumene hydroperoxide other substances readily producing free radicals under the conditions of this application can be used, particularly the peroxides, for instance, benzoyl peroxide, benzoin, zinc peroxide, magnesium peroxide, acetyl peroxide, tertiary butyl peroxide, hydrogen peroxide, percarbonates and perborates.

EXAMPLE XXI

| | |
|---|---|
| Butadiene (75%)-styrene (25%) copolymer | 120 |
| Chlorobenzene | 580 |
| Methylene bis (4-phenyl isocyanates) | 36 |
| Benzoyl peroxide | 16 |
| Butyl acetate | 480 |

The components are well mixed mechanically and brought to 95° C. with agitation and allowed to cool. The primer is thinly coated on a cellulosic backing such as cellophane. The mass is coated after 2-3 days.

The great practical advantage in these examples as contrasted in earlier examples is that a brief heating cycle is adequate to obtain optimum performance in the primer. Primers prepared by this method compare favorably with any now known.

EXAMPLE XXII

| | |
|---|---|
| Pale crepe rubber | 120 |
| Toluene | 1050 |
| M-tolylene diisocyanate | 24 |
| Cumene hydroperoxide | 6 |

Reaction procedure is the same as Example XX.

In the presence of an active peroxide, such as benzoyl peroxide, an excellent primer can be prepared with no heating. The following example will illustrate this:

EXAMPLE XXIII

| | |
|---|---|
| Pale crepe rubber | 120 |
| Toluene | 1050 |
| Methylene bis (4-phenyl isocyanate) | 24 |
| Benzoyl peroxide | 6 |

The mixture is thoroughly agitated and then allowed to stand 16 or more hours. After this time a mixture results of sufficiently low viscosity for ready and smooth application and gives excellent bonding. The material is applied in the same manner as the previous examples.

A further example to elastomer modification will illustrate the independence of elastomer treatment and illustrate the independence of elastomer treatment and polyisocyanate interaction in the preparation of a primer.

EXAMPLE XXIV

| | |
|---|---|
| Pale crepe rubber | 100 |
| Toluene | 900 |
| Cumene hydroperoxide | 10 |

Heated together to 95° C. and allowed to cool. 20 methylene bis (4-phenyl isocyanate) in 200 toluene is mixed into above reaction mixture.

These preparations are preferably carried out in the presence of air or oxygen to obtain maximum drop in viscosity and a primer smoothly and easily applied. In the absence of both air and peroxide catalyst, an unworkable gel may result.

EXAMPLE XXV

| | |
|---|---|
| Butadiene (75%)-styrene (25%) copolymer | 120 |
| Chlorobenzene | 580 |
| Dianisidine diisocyanate | 36 |
| Benzoyl peroxide | 3.6 |
| Butyl acetate | 480 |

The components are well mixed mechanically and heated to 95° C. with good agitation. After cooling, the primer is thinly spread onto a cellophane sheet. The primed sheet is then dried and coated with pressure-sensitive adhesive after two days.

EXAMPLE XXVI

| | |
|---|---|
| Pale crepe rubber | 100 |
| Toluene | 900 |
| Dianisidine diisocyanate | 20 |
| Cumene hydroperoxide | 2 |

The mixture is heated to 85° C. with good agitation. After cooling, the primer is thinly spread onto a cellulosic backing, such as cellophane. The primed backing is then coated with pressure-sensitive adhesive after two to three days.

EXAMPLE XXVII

| | |
|---|---|
| Butadiene (75%)-styrene (25%) copolymers | 100 |
| Toluene | 900 |
| M-tolylene diisocyanate | 20 |
| Benzoyl peroxide | 1 |

The mixture is heated to 95° C. and then allowed to cool. It is then thinly coated onto a cellophane sheet and permitted to stand for one to three days. One ounce per square yard of pressure-sensitive adhesive is then coated onto the primed cellophane sheet.

EXAMPLE XXVII

Pale crepe rubber _____ 100
Toluene _____ 900
M-tolylene diisocyanate _____ 30
Benzoyl peroxide _____ 3

The mixture is thoroughly agitated and allowed to stand for twenty-four hours. A thin coating is then placed onto a cellophane or other cellulosic backing. After three days, a pressure-sensitive adhesive is coated onto the backing.

EXAMPLE XXIX

Pale crepe rubber _____ 120
Toluene _____ 1050
M-tolylene diisocyanate _____ 24

The mixture is thoroughly agitated and then refluxed for 18 hours. After cooling, the primer is thinly coated onto a cellophane sheet. After two days, the pressure-sensitive adhesive is placed upon the prime sheet.

| Time between Priming and Coating | One Hour, ozs. | One Day, ozs. | Two Days, ozs. | Five Days, ozs. |
|---|---|---|---|---|
| anchorage 1 day after coating | 22.6 | 40.4 | 52.3 | 54.4 |
| anchorage 2 weeks after coating | 21.3 | 36.2 | 55.5 | 54.0 |

The anchorage tests for the above table were conducted as follows: 2 ozs. (dry weight) of a standard rubber mass similar to that disclosed above is coated on the primed cellophane sheet. While the adhesive is still wet, 80 x 80 cloth is firmly pressed into the adhesive and the laminated structure is then dried. One inch wide strips are cut from the sheet and the cloth is separated from the cellophane by the peel-back method of stripping in a tensile machine with a lower jaw speed of 33 inches per minute. The anchorage value is the average force in ounces per inch width record on the tensile machine.

Additional examples are given in the following table:

| Examples | Primer | Film | Interval between Priming and Coating, hours | Adhesive Used | Adhesive Weight, ozs./sq. yd. | Anchorage Observed |
|---|---|---|---|---|---|---|
| XXX | A | Cellophane | 72 | B | 1.25 | Very good. |
| XXXI | B | do | 1 | D | 0.9 | Fair. |
| XXXII | D | do | 24 | E | 1.0 | Good. |
| XXXIII | A | Cellulose acetate | 96 | C | 1.0 | Do. |
| XXXIV | C | Ethyl Cellulose | 1 | A | 0.9 | Fair. |
| XXXV | None | Cellophane |  | A | 0.75 | Poor. |

Adhesive types are identical to original disclosure.

The effective anchorage obtained with a primer utilizing a wide range of diisocyanate contents is clearly illustrated in the graph of Fig. 4. It is to be noted that as little as .1 part of a polyfunctional isocyanate [bis (para' diisocyanato diphenyl) methane] on a backing causes an increase in the anchorage of pressure-sensitive adhesive as compared to the anchorage on a backing having no primer coat, with the best anchorage being obtained when from one to 350 parts of polyfunctional isocyanate are used with one hundred parts of an elastomer. The primers used in the graph of Fig. 4 were not previously heated or cooked during their preparation.

The effect of the lapse of time between the priming of the backing and the coating of a pressure-sensitive adhesive thereon upon the final mass anchorage of the adhesive is illustrated in the graph of Fig. 5.

The composition of the primer utilized to obtain the data for the graph of Fig. 5 is as follows:

Pale crepe rubber _____ 100
M.D.I. bis (para' diisocyanato diphenyl) methane__ 22.75
Cumene hydroperoxide _____ 15.2
Toluene _____ 101.2

The mixture was stirred and heated for three hours at 49° C. and the primer coating was applied to a cellophane backing after a period of six days. From studying the graph of Fig. 5 it may be noted that coating the primed backing with pressure-sensitive adhesive one hour after priming results in a considerable improvement in anchorage over a backing having no primer at all (35 ozs. vs. 10 ozs.). However, maximum anchorage is obtained when the sheet is coated with the adhesive two to eight days after priming. A certain lapse of time between priming and coating of the backing is necessary to secure a certain anchorage level since it has been noted that anchorage does not improve after the adhesive mass has been applied to the primed backing. This may be seen from the following table:

The composition of the adhesives used are similar to those previously disclosed above. The primers which are listed as A, B, C and D have the following composition:

Primer A:
    100 pale crepe. Milled 25 passes through rubber mill—1 mil nip opening
    40 tolylene diisocyanate
    1500 toluene
    No heat cycle Primer B:
    100 pale crepe
    80 tolylene diisocyanate
    1000 toluene
    Sol'n refluxed 2 hours at 111° C.

Primer C:
    100 pale crepe. Milled 25 passes through rubber mill—1 mil nip opening
    150 methylene bis (4 phenyl isocyanate)
    3 cumene hydroperoxide
    2000 toluene
    No heat cycle Primer D:
    100 pale crepe
    3 cumene hydroperoxide
    1200 toluene
    Above solution heated for 5 hours at 55° C. After cooling 10 parts methylene bis (4 phenyl isocyanate) is added To further characterize the invention, we have discovered that a preliminary test of effectiveness may be carried out by treating diluted primer with aniline. Our primers give substantial precipitates when thus treated, while primers which have lost optimum effectiveness give only slight or negative reaction.

The effect of time and temperature of aging the primer on a cellulosic backing upon the final mass anchorage of the adhesive on the primed film is illustrated in the graph of Fig. 6.

The composition of the primer utilized to obtain the data for the graph of Fig. 6 is as follows:

Pale crepe rubber (milled 25 passes through a rubber mill—one mil nipple) _____ 100.0
M.D.I. bis (para di-isocyanato diphenyl) methane_ 3.1
Toluene_____ 1150.0

The mixture was stirred and the primer coating was applied to a number of cellophane backings by knife coating. The primed cellophane backings were then aged under varying conditions of time and temperature. These primed backings were then coated with an adhesive and anchorage values determined by the method of testing described in detail hereinbefore in discussing the graph of Fig. 5.

From studying the graph of Fig. 6 it is noted that the time and temperature conditions employed for aging the primer affect the final mass anchorage of the adhesive on the primed film. As the temperature of aging is increased, the time of aging should be correspondingly decreased for obtaining optimum results. As is seen from the graph of Fig. 6 good anchorage values (i.e. 30 oz. or better) are obtained at an aging temperature of 150° C. when the time of aging is from .0012 hr. (about 4.3 seconds) to .0022 hr. (about 7.9 seconds). In order to obtain like results at a lower aging tempeature, a longer period of aging is required. Thus, at an aging temperature of 90° C., a desirable period of aging would be in the range of about 0.010 hr. (36 seconds) to about 0.6 hr. (about 216 seconds).

Another factor which must be considered with respect to the time and temperature of aging the primer is the effect such conditions have on the characteristics of the cellulosic backing. In order to study this effect, a number of cellophane sheets were heated at various temperatures and times. The brittleness of the cellophane immediately after removal from the oven was judged by passing the sheet in a folded condition over a knife edge. The brittleness was noted by a decrease in the number of passes the sheet would withstand before breaking, the results being shown in the following table:

| No heat | Mins. | Tough—no breakage |
|---|---|---|
| 80° C | 3 | broke after 6 passes. |
| 80° C | 5 | broke after 3 passes. |
| 100° C | 1 | no breakage. |
| 100° C | 3 | broke after 3 passes. |
| 100° C | 5 | Do. |
| 100° C | 10 | broke after 2 passes. |
| 121° C | 1 | broke on first pass. |

It is seen, therefore, from the results shown in the graph of Fig. 6 and in the above that for good results the time decreases as the temperature increases. Also, the time may vary from a few seconds, as for example 8 seconds, to a number of days, as for example 8 days, depending upon the particular temperature employed. In like manner, the temperature may vary from 150° C. to room temperature depending upon the time of aging. In general, the primed sheet should not be heated for more than 5 minutes at temperatures at about 100° C. nor for more than a minute at higher temperatures to prevent embrittlement of the sheet. Of course, the minimum heat or aging cycle between priming and coating will vary depending upon the temperature of aging. For example, at 21° C. a minimum time of 300 minutes is required, at 70° C. a minimum of 18 minutes, at 100° C. a minimum of 0.6 minute, and at 121° C. a minimum of 0.2 minute.

Reference is made to Fig. 7 of the drawing illustrating an adhesive sheet of the present invention prepared in accordance with Example I. As is shown in Fig. 7, a cellophane backing is provided on one side with a primer coat (natural rubber-P-P-diisocyanato diphenyl methane of Example I). An adhesive coat (natural rubber-polybetapene resin adhesive of Example I) is anchored to the backing 1 by means of primer coat.

The invention in its broader aspects is not limited to the specific steps, processes, combinations and improvements shown and described but departures may be made therefrom within the scope of the accompanying claims without departing from the principles of the invention and without sacrificing its chief advantages.

What is claimed is:

1. In the method of preparing a pressure-sensitive cellulosic adhesive sheet by mixing one to three hundred and fifty parts by weight of a polyfunctional isocyanate having the formula $R(N{=}C{=}O)_x$ where $x$ is at least two and R is a polyvalent organic radical selected from the group consisting of an aryl, alkyl, substituted aryl and a substituted alkyl, and one hundred parts of a rubbery material selected from the group consisting of natural rubber, copolymers of butadiene and styrene comprising at least 30% of butadiene, polybutadiene, and copolymers of isobutylene and isoprene; applying the resulting composition in the amount of from one-one hundredth of an ounce to one-half ounce per square yard to a flexible, regenerated cellulose film backing, aging said composition in said backing, and applying a pressure-sensitive adhesive comprising a rubber material to said coated backing, the improvement comprising aging the composition in the backing at a temperature between about room temperature up to about 150° C. and for a period of time between about 8 seconds up to about 8 days, thereby causing the primer to bond to the backing without deleteriously affecting the backing, said temperature range and said time range being in inverse order with respect to one another, and said time being less than about three minutes at a temperature above 80° C. and not more than about one minute at a temperature of 100° C.

2. In the method of preparing a pressure-sensitive cellulosic adhesive sheet by mixing one to three hundred and fifty parts by weight of a polyfunctional isocyanate having the formula $R(N{=}C{=}O)_x$ where $x$ is at least two and R is a polyvalent organic radical selected from the group consisting of an aryl, alkyl, substituted aryl and a substituted alkyl, and one hundred parts of a rubbery material selected from the group consisting of natural rubber, copolymers of butadiene and styrene comprising at least 30% of butadiene, polybutadiene, and copolymers of isobutylene and isoprene; applying the resulting composition in the amount of from one-one-hundredth of an ounce to one-half ounce per square yard to a flexible, regenerated cellulose film backing, aging said composition in said backing, and applying a pressure-sensitive adhesive comprising a rubber material to said coated backing, the improvement comprising adding at least one part of an active peroxide to the mixture of the isocyanate and rubbery material, agitating the mixture, allowing the mixture to stand prior to applying same to the cellulosic backing, and aging the composition in the backing at a temperature between about room temperature up to about 150° C. and for a period of time between about 8 seconds up to about 8 days, thereby causing the primer to bond to the backing without deleteriously affecting the backing, said temperature range and said time range being in inverse order with respect to one another, and said time being less than about three minutes at a temperature above 80° C. and not more than about one minute at a temperature of 100° C.

3. In the method according to claim 1 wherein the polyfunctional isocyanate is a diisocyanate.

4. In the method according to claim 1 wherein the polyfunctional isocyanate is p-p′ diisocyanato diphenyl methane.

5. In the method according to claim 1 wherein the polyfunctional isocyanate is m-tolylene diisocyanate.

6. In the method according to claim 1 wherein the rubbery material is natural rubber.

7. In the method according to claim 1 wherein the rubber material is butadiene polymer.

8. A normally tacky and pressure-sensitive adhesive sheet formed in accordance with the method of claim 1.

References Cited in the file of this patent

UNITED STATES PATENTS

| | | |
|---|---|---|
| 2,331,894 | Drew | Oct. 19, 1943 |
| 2,415,839 | Neal et al. | Feb. 18, 1947 |
| 2,417,792 | Verbanc | Mar. 18, 1947 |
| 2,430,479 | Pratt et al. | Nov. 11, 1947 |
| 2,436,222 | Neal et al. | Feb. 17, 1948 |
| 2,555,745 | Hopkins | June 5, 1951 |